(12) United States Patent
Sakai et al.

(10) Patent No.: US 7,182,276 B2
(45) Date of Patent: Feb. 27, 2007

(54) CLEANING DEVICE OF VEHICLE LAMP

(75) Inventors: Masaru Sakai, Shizuoka (JP); Masaaki Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/288,837

(22) Filed: Nov. 28, 2005

(65) Prior Publication Data

US 2006/0114666 A1 Jun. 1, 2006

(30) Foreign Application Priority Data

Nov. 29, 2004 (JP) ............................ P.2004-343733

(51) Int. Cl.
*B05B 1/10* (2006.01)
*B05B 1/30* (2006.01)
*B60S 1/46* (2006.01)

(52) U.S. Cl. .............................. 239/284.2; 239/284.1; 239/571

(58) Field of Classification Search ............. 239/284.2, 239/284.1, 571, 288, 288.3, 569, 570; 137/859
See application file for complete search history.

(56) References Cited

U.S. PATENT DOCUMENTS

| | | | | |
|---|---|---|---|---|
| 4,955,543 A | * | 9/1990 | Orth et al. | 239/284.2 |
| 5,605,286 A | * | 2/1997 | Orth et al. | 239/284.2 |
| 5,636,794 A | * | 6/1997 | Hess et al. | 239/284.1 |
| 5,762,271 A | * | 6/1998 | Lind et al. | 239/284.2 |
| 6,752,329 B1 | * | 6/2004 | Price | 239/284.2 |
| 2003/0089409 A1 | * | 5/2003 | Morimoto | 137/859 |
| 2003/0116645 A1 | * | 6/2003 | Hirose et al. | 239/284.2 |

FOREIGN PATENT DOCUMENTS

JP 08-058533 3/1996

* cited by examiner

*Primary Examiner*—Kevin Shaver
*Assistant Examiner*—Darren Gorman
(74) *Attorney, Agent, or Firm*—Fish & Richardson P.C.

(57) ABSTRACT

A check valve of a cleaning device of a vehicle lamp is provided with a cleaning liquid influx portion, a valve disposing portion, and a cleaning liquid efflux portion which are arranged in series in a sliding direction of the piston. A valve body is disposed in the valve disposing portion. The valve body opens and closes a space between the cleaning liquid influx portion and the cleaning liquid efflux portion, when at least a portion of the valve body moves in a direction substantially perpendicular to a sliding direction of a piston.

7 Claims, 13 Drawing Sheets

CLEANING DEVICE OF VEHICLE LAMP

The present application claims foreign priority based on Japanese Patent Application No. P.2004-343733, filed on Nov. 29, 2004, the contents of which are incorporated herein by reference.

BACKGROUND OF THE INVENTION

1. Field of the Invention

The present invention relates to a cleaning device for a vehicle lamp. More particularly, the present invention relates to a technique for downsizing an overall cleaning device in a direction perpendicular to the sliding direction of a piston.

2. Related Art

A vehicle lamp, such as a headlamp, is an important functional part in a vehicle. Therefore, an impairment of a beam illumination capability should be avoided.

One cause of the impairment of the illumination capability of the vehicle lamp such as a headlamp is a staining of a front lens. For example, during traveling on an unpaved road at the time of a rainfall or snow thawing, muddy water splashed by an own vehicle, a preceding vehicle, or an oncoming vehicle may attach onto a front lens. Thereby, a hindrance to the illumination of the beam is occurred by the mud on the front lens. Therefore, it has been necessary to remove stains such as the mud attached to the front lens at an appropriate timing even during traveling.

Accordingly, there is a cleaning device for a vehicle lamp to wash away the stains such as mud attached to the front lens by injecting a cleaning liquid to the front lens, as necessary.

In the cleaning device for a vehicle lamp, since the cleaning liquid is injected to the front lens, the injection port should be located further forwardly of the front lens. However, if the nozzle having the injection port is located further forwardly of the front lens, a projected object is present at a front portion of the vehicle. This is not favorable in terms of safety. Accordingly, JP-A-08-058533 discloses a cleaning device, so-called pop-up type, in which the nozzle having the injection port is normally located on the reverse side of a bumper and the like, and the nozzle is adapted to project forwardly of the front lens when the injection of the cleaning liquid is required.

In the cleaning device disclosed in JP-A-08-058533, a cleaning liquid passage is formed in the piston, the nozzle is connected to its front end portion, and a check valve is provided at its rear end portion. When the device is not in use, i.e., when the injection of the cleaning liquid is not carried out, the piston is held in a state of being retracted inside the cylinder by a spring interposed between the cylinder and the piston. As the cleaning liquid is supplied into the cylinder, the piston starts to project from the cylinder, and when the piston has projected from the cylinder and the pressure of the cleaning liquid within the cylinder has increased to more than a predetermined level, the check valve is opened, and the cleaning liquid flows into the piston is then injected from the injection port of the nozzle.

In the cleaning device for a vehicle lamp disclosed in JP-A-08-058533, the respective members making up a check valve are arranged in the sliding direction of the piston, and the respective members making up the check valve are operated in the sliding direction of the piston to effect the opening and closing of the cleaning liquid passage. For this reason, the size of the check valve in the radial direction of the piston becomes large, and the outside diameters of the piston and the cylinder are bound to be also large. Accordingly, a large space is required in the height-wise direction when the device is installed in the vehicle.

In a vehicle, such as an automobile, there are many cases where a large space cannot be secured in the vertical direction around a headlamp in view of the requirements in design. Hence, there is an increased demand for a cleaning device which can be installed in a small space on the upper or lower side or on the left or right side of the headlamp.

SUMMARY OF THE INVENTION

One or more embodiments of the present invention provide a cleaning device downsized in a direction perpendicular to a sliding direction of a piston.

In accordance with one or more embodiments of the present invention, a cleaning device for a vehicle lamp is provided with: a cylinder to which a cleaning liquid is supplied; a piston slidably coupled to the cylinder and including a cleaning liquid passage; a nozzle including an injection port for injecting the cleaning liquid; a retracting spring interposed between the piston and the cylinder so as to urge the piston in a direction of retracting the piston into the cylinder; a check valve interposed between the nozzle and the piston, wherein the check valve includes a cleaning liquid influx portion, a valve disposing portion, and a cleaning liquid efflux portion; and a valve body disposed in the valve disposing portion, wherein at least a portion of the valve body moves in a direction substantially perpendicular to the sliding direction of the piston, so as to open and close a space between the cleaning liquid influx portion and the cleaning liquid efflux portion. In the cleaning device, the cleaning liquid influx portion, the valve disposing portion, and the cleaning liquid efflux portion are arranged in series in a sliding direction of the piston.

Accordingly, with the cleaning device for a vehicle lamp in accordance with one or more embodiments of the invention, the valve body is disposed such that its radial direction is parallel to the sliding direction of the piston. Moreover, the amount of the cleaning liquid remaining between the check valve and the nozzle when the check valve is closed is small.

In addition, since the valve body is disposed such that its radial direction is parallel to the sliding direction of the piston, if an arrangement is provided such that the sliding direction of the piston substantially conforms to the back-and-forth direction, and such that the radial direction of the valve body becomes substantially horizontal, the vertical size of the overall device can be made small. As a result, the cleaning device can be disposed in a small space on the upper or lower side or on the left or right side along the periphery of the vehicle lamp. In addition, since the check valve is disposed at the front end of the piston, i.e., immediately in front of the nozzle, when the injection of the cleaning liquid is stopped, the amount of the cleaning liquid remaining between the check valve and the nozzle is very small, and the cleaning liquid practically does not leak from the nozzle when the device is not in use.

Moreover, in accordance with one or more embodiments of the present invention, the valve disposing portion may include: a valve body accommodating recess communicating with the cleaning liquid efflux portion and having an air hole communicating with an outside, wherein the valve body accommodating recess is arranged in the direction substantially perpendicular to the sliding direction of the piston; a pressure forming portion communicating with the cleaning liquid influx portion, wherein the pressure forming portion is arranged in the direction substantially perpendicular to the sliding direction of the piston; and a communicating hole for communicating the valve body accommodating recess and the pressure forming portion.

In addition, the valve body is accommodated in the valve body accommodating recess so as to divide the communicating hole and the cleaning liquid efflux portion and the air hole. Moreover, when the pressure of the cleaning liquid is increased in the pressure forming portion, the valve body moves toward the air hole, so that the pressure forming portion and the cleaning liquid efflux portion are communicated with each other. Accordingly, the operation of the valve body is effected smoothly.

In addition, in accordance with one or more embodiments of the present invention, a convex portion projecting from the communicating hole to a side of the pressure forming portion during the closing of the communicating hole may be formed on a central portion of the valve body. Accordingly, the area of the valve body to which the pressure of the cleaning liquid is applied can be made large.

In addition, in accordance with one or more embodiments of the present invention, the cleaning device may further be provided with: a valve spring disposed in the valve body accommodating recess and urging the valve body in a direction of closing the communicating hole disposed in the valve body accommodating recess; and a plate having high rigidity and interposed between the valve body and the valve spring. Accordingly, the force of the valve spring is transmitted to the valve body without a loss.

In addition, in accordance with one or more embodiments of the present invention, a force with which the restacting spring urges the piston in the direction of retracting the piston into the cylinder may be set weaker than a force with which the valve spring urges the valve body in the direction of closing the communicating hole. Therefore, the injection of the cleaning liquid is carried out after the piston has projected from the cylinder.

It should be noted that although in the embodiments a tensile spring is illustrated as the retracting spring, the retracting spring according to the claims is not limited to the tensile spring, and includes a compression spring as well. In short, it suffices if the retracting spring acts so as to retract the piston into the cylinder.

Other aspects and advantages of the invention will be apparent from the following description and the appended claims.

REFERENCE NUMERALS AND CHARACTERS

1: cleaning device for a vehicle lamp, 2: cylinder, 24: tensile spring (retracting spring), 3: piston, 3a: interior (cleaning liquid passage), 4: check valve, 411: main portion (valve disposing portion), 411b: valve body accommodating recess 411b, 411c: pressure forming portion, 411e: communicating hole, 412a: cleaning liquid influx portion, 413a: cleaning liquid efflux portion, 421: air hole, 43: valve body, 431: convex portion, 44: valve spring, 45: plate, 5: nozzle, 511: injection port

DESCRIPTION OF THE PREFERRED EMBODIMENTS

Embodiments of the invention will be described with reference to the accompanying drawings.

A cleaning device 1 for a vehicle lamp is structured by a cylinder 2; a piston 3 slidably coupled to the cylinder 2; and a nozzle 5 connected to a distal end of the piston 3 through a check valve 4.

The cylinder 2 has a substantially tubular main portion 21 and a joint portion 22 for closing a rear end of the main portion 21.

A plurality of engaging projections 21a and 21b (see FIGS. 3 and 4) are respectively formed on a front end portion and a rear end portion on an outer peripheral surface of the main portion 21 at intervals in the circumferential direction. In addition, an inwardly projecting inner flange 21c (see FIG. 5) is formed in a front end of the main portion 21.

The joint portion 22 has a substantially annular shape, and is constructed such that a fitting portion 221 whose rear end is closed and a connecting tube 222 connected to a rear end of the fitting portion 221 and projecting laterally are integrally formed. A plurality of engaging holes 221a are formed in the fitting portion 221 at intervals in the circumferential direction. In addition, a spring latching portion 221b is integrally formed in the fitting portion 221 (see FIGS. 3 to 5).

The fitting portion 221 of the joint portion 22 is fitted over a rear end portion of the main portion 21, and the engaging projections 21b formed on the outer peripheral surface of the main portion 21 are engaged in the engaging holes of the joint portion 22. The joint portion 22 is thereby attached to the rear end portion of the main portion 21. It should be noted that a groove 221c is formed over the entire circumference on an inner surface of a rear end portion of the fitting portion 221 of the joint portion 22, and the rear end of the main portion 21 is fitted to the groove 221c in a state in which an O-ring is fitted on the farthest side of the groove 221c (see FIG. 5).

The piston 3 is slidably coupled to the cylinder 2. The piston 3 is formed in a substantially cylindrical shape, an engaging groove 31 is formed over the entire circumference on its rear end portion, and a flange 32 projects from the front side of the engaging groove 31. Further, the outside diameter of the flange 32 is formed to be substantially identical to the inside diameter of the main portion 21 of the cylinder 2, such that an outer peripheral surface of the flange 32 is brought into sliding contact with an inner peripheral surface of the main portion 21 of the cylinder 2 (see FIG. 5).

Figure 8:
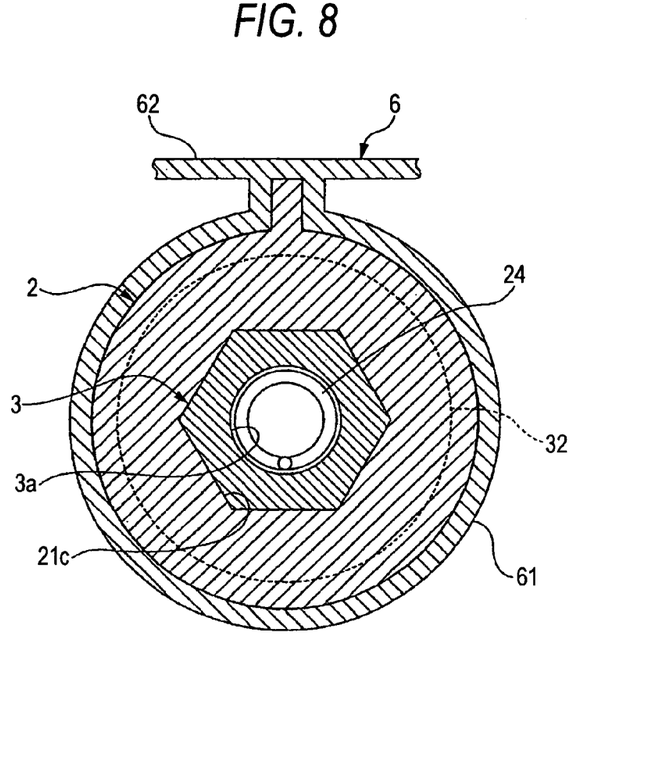
FIG. 8 is an enlarged cross-sectional view taken along line VIII—VIII in FIG. 5.

A small-diameter portion 33 whose outside diameter is smaller than that of the remaining portion is formed in a front end portion of the piston 3, and a plurality of engaging projections 34 are formed on the outer peripheral surface at a portion close of a rear end of the small-diameter portion 33 at intervals in the circumferential direction. Further, an engaging groove 35 is formed over the entire circumference on the outer peripheral surface at a position immediately in front of the engaging projections 34 (see FIG. 5). In terms of the shape, the outer peripheral surface of the piston 3 extending from the immediate rear of the small-diameter portion 33 of the piston 3 to the flange 32, as viewed in a cross section perpendicular to the axial direction, is formed in a circular shape other than a round, such as an ellipse or an elongated circle, or is formed by flat surfaces and/or curved surfaces continuous at angles with respect to each other. For example, the outer peripheral surface of this portion of the piston 3 is formed in such as a regular polygon, a circular shape other than a round such as an ellipse or an elongated circle, and a co-called D-cut circular shape in which a portion of a circular arc is replaced by a flat surface. In this embodiment, the outer peripheral surface of this portion of the piston 3 is formed in a regular hexagon (see FIG. 8). It should be noted that the shape of an inner peripheral surface of the inner flange 21c formed at a front end of the aforementioned cylinder 2 is set in a shape which fits the shape of the aforementioned outer peripheral surface of the piston 3, thereby preventing the rotation of the piston 3 in a direction about the axis. In this embodiment, the shape of the inner peripheral surface of the inner flange 21c of the cylinder 2 is formed in a regular hexagon (see FIG. 8).

Figure 5:
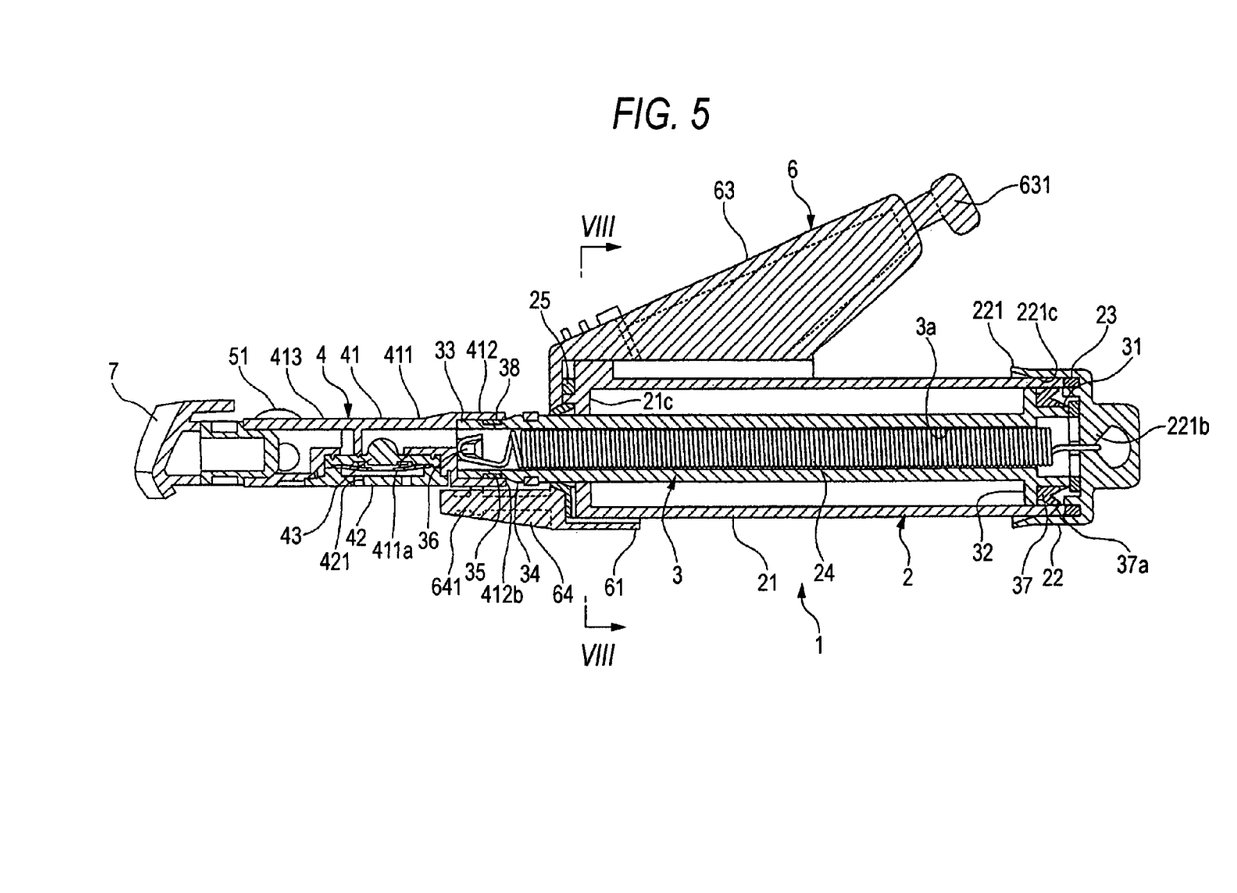
FIG. 5 is a longitudinal cross-sectional view of the cleaning device in its entirety.

Further, a spring latching bar 36 is formed at front end portion of the piston 3 in such a manner as to bridge inner peripheral surface portions (see FIG. 5).

A seal body 37 formed of an elastic material substantially annularly is fitted in the engaging groove 31 formed at the rear end portion of the piston 3, and an O-ring 38 is fitted in the engaging groove 35 formed in the small-diameter portion 33 of the front end portion. It should be noted that the seal body 37 is formed in a sideways-laid V-shape in terms of its cross-sectional shape, such that an outwardly located crease portion 37a is located slightly outwardly of the flange 32 (see FIG. 5). In consequence, the crease portion 37a is brought into sliding contact with the inner peripheral surface of the main portion 21 of the cylinder 2 in a state of close contact therewith.

The piston 3 is inserted into the main portion 21 of the cylinder 2 from the rear end thereof, and the rear end of the main portion 21 of the cylinder 2 is subsequently closed by the joint portion 22. Then, a tensile spring 24 (as the retracting spring 24) is loaded between the spring latching portion 221b and the spring latching portion 36 of the piston 3. Consequently, the piston 3 is coupled to the cylinder 2 axially slidably, and is held in a state of being retracted in the cylinder 2 by the tensile spring 24 (see FIG. 5). As the tensile spring 24 is thus disposed in the piston 3, the size of the cylinder 2 in the radial and axial directions can be formed compactly. In the state in which the piston 3 is retracted in the cylinder 2, a portion of the piston 3 extending from a position located slightly rearwardly of the small-diameter portion 33 to the front end-side portion assumes a state of projecting forwardly from the cylinder 2, and a dust cover 25 fixed to a front end face of the main portion 21 of the cylinder 2 assumes a state of being in contact with the outer peripheral surface of the piston 3 (see FIG. 5). It should be noted that the dust cover 25 is formed of an elastic material such as rubber into an annular shape, and the shape of its inner peripheral portion is formed into a shape corresponding to the shape of the outer peripheral surface of the piston 3. Namely, the shape of the inner peripheral portion of the dust cover 25, as viewed in a cross section perpendicular to the axial direction, is formed in a circular shape other than a round, such as an ellipse or an elongated circle, or is formed by flat surfaces and/or curved surfaces continuous at angles with respect to each other.

The check valve 4 and the nozzle 5 are connected to the front end portion of the piston 3.

The check valve 4 is formed by a case body 41, a cover body 42, a valve body 43, a valve spring 44, and a plate 45.

Figure 9:
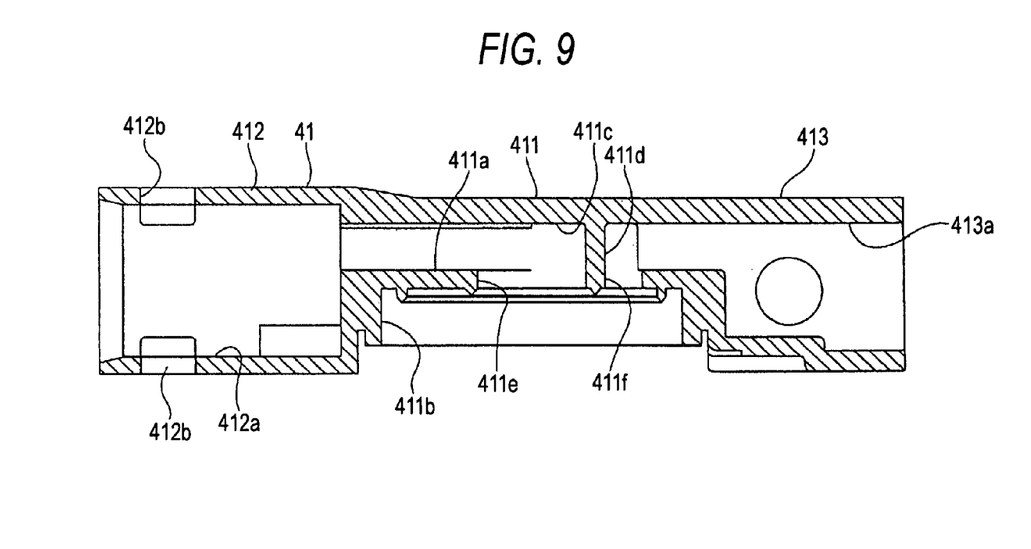
FIG. 9 is a longitudinal cross-sectional view of a case body for illustrating a check valve.
Figure 10:
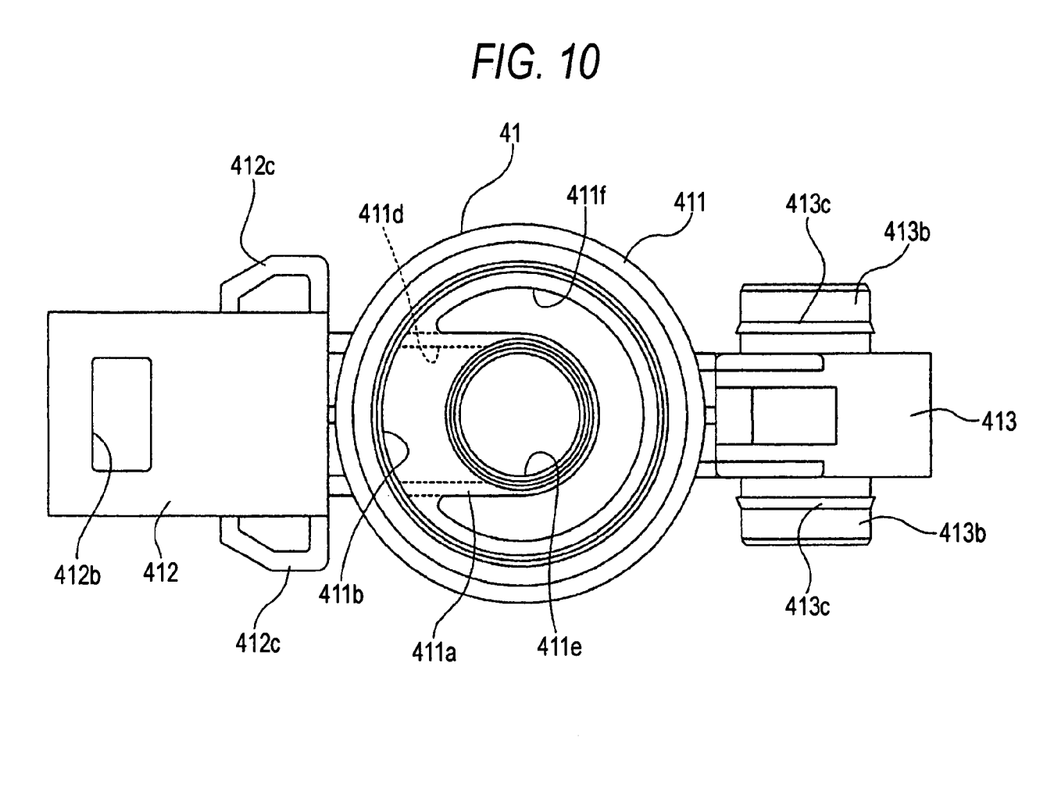
FIG. 10 is a bottom view of the case body.

As can be seen from FIGS. 9 and 10, the case body 41 is constructed such that a main portion 411, which has a substantially flat, i.e., axially short, tubular shape and serves as a valve disposing portion, and connecting portions 412 and 413, which are substantially tubular and connected to the front and rear sides of the main portion 411, are formed integrally. The main portion 411 is formed with its axial direction extending in a vertical direction, and is divided by a division wall 411a into two portions on the upper and lower sides, i.e., a valve body accommodating recess 411b and a pressure forming portion 411c. The pressure forming portion 411c is partitioned from a portion communicating with the connecting portion 413 by a partition wall 411d, which is semicircular as viewed from above, and communicates with the connecting portion 412. A circular communicating hole 411e, which is located on the inner side of the position where the partition wall 411d is formed, is formed in the division wall 411a, and the pressure forming portion 411c and the valve body accommodating recess 411b are communicated with each other by the communicating hole 411e. In addition, a circular arc-shaped orifice 411f, which is located on the outer side of the partition wall 411d, is formed in the partition wall 411a, and the valve body accommodating recess 411b and the connecting portion 413 are communicated by the orifice 411f. Further, an inner side 412a of the connecting portion 412 serves as a cleaning liquid influx portion and communicates with the pressure forming portion 411c, while an inner side 413a of the connecting portion 413 serves as a cleaning liquid efflux portion and communicates with the valve body accommodating recess 411b through the orifice 411f.

Figure 7:
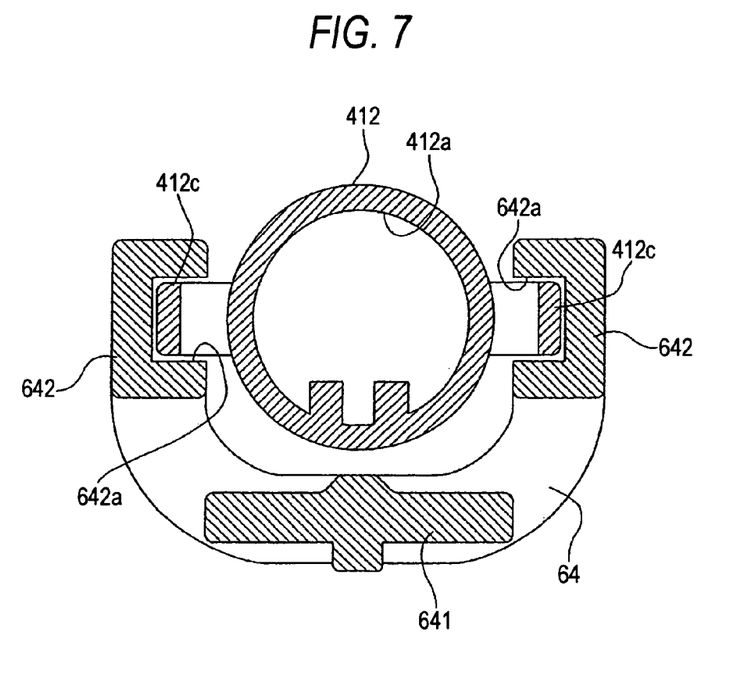
FIG. 7 is an enlarged cross-sectional view taken along line VII—VII in FIG. 6.

A pair of engaging holes 412b are formed at an end portion of the connecting portion 412 on the proximal portion side of the case body 41 at equal intervals in the circumferential direction. Further, a pair of restricted projections 412c respectively project from side surfaces on the distal end side of the connecting portion 412 (see FIGS. 7 and 10).

A pair of joining portions 413b projecting to the left and the right are formed on the distal end-side connecting portion 413, and the cleaning liquid efflux portion 413a communicates with the joining portions 413b. Further, an engaging protrusion 413c extending annularly is formed on an outer peripheral surface of each of the joining portions 413b.

Figure 11:
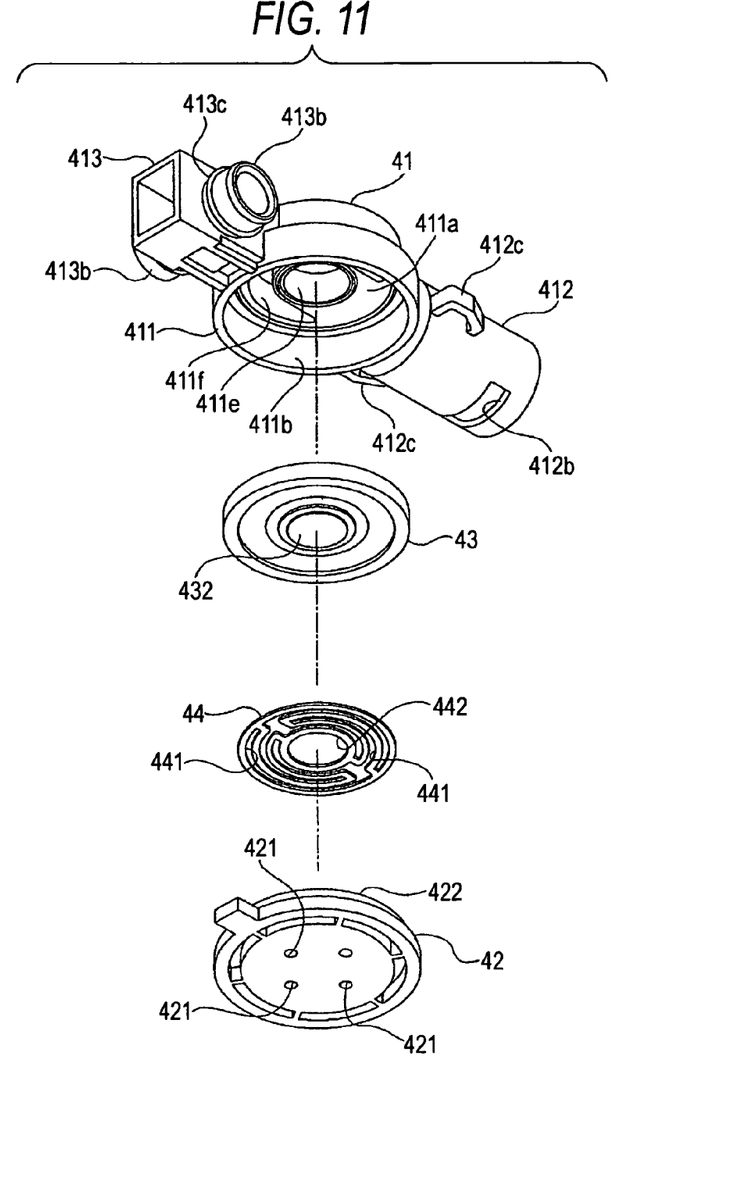
FIG. 11 is an explodes perspective view of the check valve.
Figure 12:
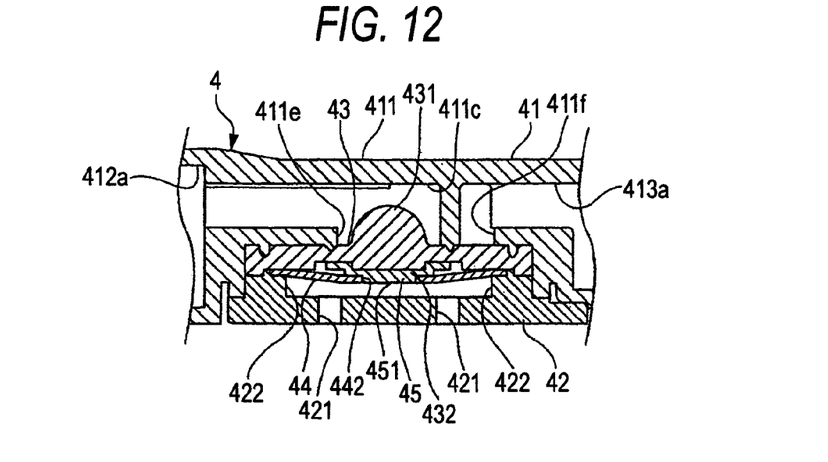
FIG. 12 is a longitudinal cross-sectional view of the check valve in a closed state.
Figure 13:
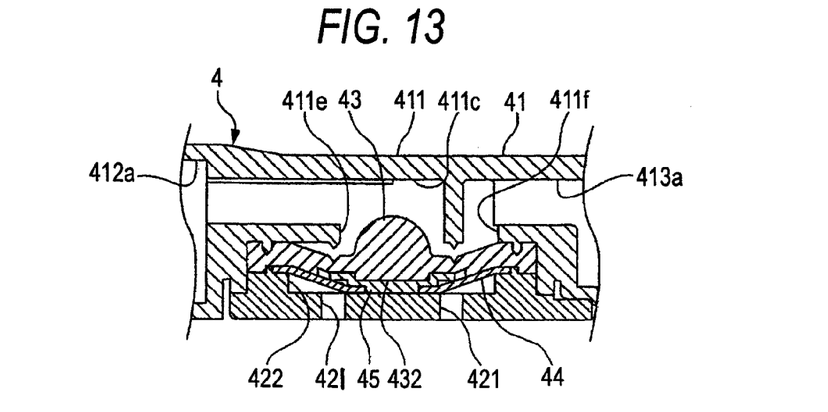
FIG. 13 is a longitudinal cross-sectional view of the check valve in an operational state.

As can be seen from FIGS. 11 to 13, the valve body 43 is formed of a rubber-like elastic material such as synthetic rubber, and is formed into a substantially disk-like shape. A convex portion 431 projecting in a dome form is integrally formed on a central portion of the valve body 43, and a stairs-like projecting portion 432 is formed on the reverse side of the valve body 43 at a position substantially corresponding to the convex portion 431. Further, the plate 45 is provided in such a manner as to cover the stairs-like projecting portion 432 and its peripheral portion. The plate 45 is formed by subjecting a material having a higher rigidity than the material of the valve body 43, e.g., a metal plate, to press working or the like, and the valve body 43 and the plate 45 are integrated by insert molding or the like during the molding of the valve body 43.

As can be well understood from FIG. 11, in particular, the valve spring 44 is formed of a leaf spring material, and has a circular outer shape. Circular arc-shaped slits 441 are formed from peripheral portions toward a central portion in the form of a labyrinth, and a circular hole 442 of a size for allowing a projection 451 at the center of the plate 45 to be fitted therein is formed in its central portion.

The cover body 42 is for covering the valve body accommodating recess 411b and has a plurality of air holes 421, as well as a projecting wall 422 formed on its outer peripheral portion in such a manner as to extend annularly.

The valve body 43 and the valve spring 44 are inserted in that order into the valve body accommodating recess 411b. At this time, the convex portion 431 of the valve body 43 projects from the communicating hole 411e toward the pressure forming portion 411c side, and the projection 451 of the plate 45 is set in a state of being fitted in the circular hole 442 of the valve spring 44. The cover body 42 is then attached to the case body 41. As the cover body 42 is attached to the case body 41, the valve body accommodating recess 411b communicates with the outside air only through the air holes 421. In addition, peripheral edge portions of the valve body 43 and the valve spring 44 are clamped between the projecting wall 422 of the cover body 42 and the division wall 411a of the case body 41, and their positions are thereby fixed. Further, the spring force of the valve spring 44 acts to urge the central portion of the valve body 43 in the direction toward the pressure forming portion 411c through the plate 45, thereby closing the communicating hole 411e and the orifice 411f. It should be noted that since the plate 45 whose rigidity higher than that of the valve body 43 is interposed between the valve spring 44 and the valve body 43, the force of the valve spring 44 is transmitted to the valve body 43 without waste, so that the communicating hole 411e and the orifice 411f are reliably closed.

The valve body 43 is disposed such that its radial direction is parallel to the sliding direction of the piston 3, as described above. Therefore, if an arrangement is provided such that the sliding direction of the piston 3 substantially conforms to the back-and-forth direction, and such that the radial direction of the valve body 43 becomes substantially horizontal, the vertical size of the check valve 4 can be made small. In addition, since the check valve is not provided in the piston 3, the outside diameter of the piston 3 and, hence, the outside diameter of the cylinder 2 receiving the piston 3, can be made small. Hence, the vertical size of the device as a whole can be made small, and the device can be disposed in a small space on the upper or lower side or on the left or right side along the periphery of the vehicle lamp.

As for the check valve 4, its proximal portion-side connecting portion 412 is fitted over the small-diameter portion 33 of the distal end portion of the piston 3, and the engaging projections 34 formed on the small-diameter portion 33 are engaged in the engaging holes 412b of the connecting portion 412. As a result, the check valve 4 is attached to the distal end portion of the piston 3.

In this embodiment, two nozzles 5 are provided. Each nozzle 5 consists of a nozzle body 51 and a nozzle holder 52 for holding the nozzle body 51.

Figure 14:
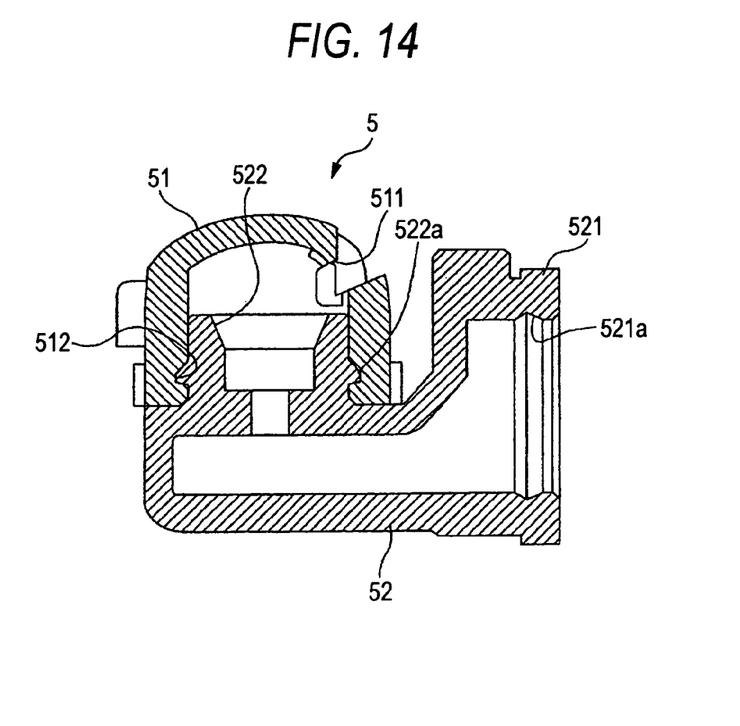
FIG. 14 is an enlarged longitudinal cross-sectional view of a nozzle.

As can be seen from FIG. 14, the nozzle body 51 has a hollow cylindrical shape with an upper end closed, and has an open injection port 511 on a side portion of its upper end portion. Further, an engaging groove 512 extending annularly is formed on an inner peripheral surface of its lower end portion. The nozzle holder 52 has an annular joining portion 521 and a tubular supporting portion 522, and the joining portion 521 and the supporting portion 522 have their axial directions perpendicular to each other, and communicate with each other. Further, an engaging groove 521a extending annularly is formed in an inner peripheral surface of the joining portion 521, and an engaging protrusion 522a extending annularly is formed on an outer peripheral surface of the supporting portion 522.

As the nozzle body 51 is fitted over the supporting portion 522 of the nozzle holder 52, and the engaging groove 512 of the nozzle body 51 and the engaging protrusion 522a of the supporting portion 522 of the nozzle holder 52 are engaged, the nozzle body 51 is prevented from coming off the nozzle holder 52. The nozzle 5 is thus formed. In addition, since the engaging groove 512 of the nozzle body 51 and the engaging protrusion 522a of the supporting portion 522 of the nozzle holder 52 are formed annularly, the nozzle body 51 can be rotated about the axis of the supporting portion 522.

As for the nozzle 5 formed as described above, the joining portion 521 of the nozzle holder 52 is fitted over the joining portion 413b formed on the connecting portion 313 of the check valve 4, and the engaging groove 521a of the nozzle holder 52 is engaged with the engaging protrusion 513c of the joining portion 413b of the check valve 4. Thus, the nozzle 5 is supported at the distal end portion of the check valve 4, and is prevented from coming off. In addition, since the engaging groove 521a of the nozzle holder 52 and the engaging protrusion 413c of the joining portion 413b of the check valve 4 are formed annularly, the nozzle 5 can be rotated about the axis of the joining portion 413b.

As described above, the orientation of the injection port 511 can be adjusted to a desired direction by the rotation of the nozzle holder 52 with respect to the joining portion 413b of the check valve 4 and the rotation of the nozzle body 51 with respect to the supporting portion 522 of the nozzle holder 52.

The above-described cylinder 2 is installed on the vehicle body by means of a bracket 6.

Figure 6:
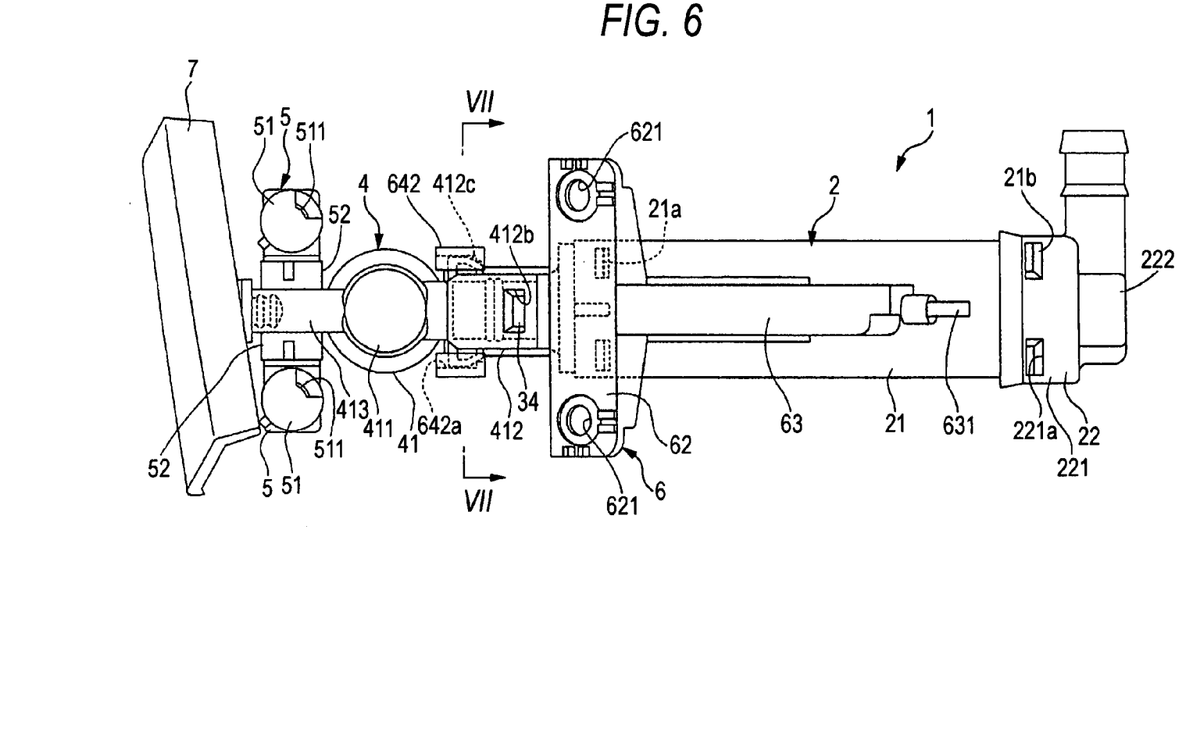
FIG. 6 is a plan view of the cleaning device in its entirety.

As can be seen FIGS. 5 and 6, the bracket 6 includes an axially short, hollow cylindrical supporting tube 61; a supporting piece 62 formed on an upper side of the supporting tube 61 in such a manner as to extend to the left and the right; a positioning piece 63 projecting from the supporting tube 61 and the supporting piece 62 rearwardly and diagonally upward; and a restricting portion 64 projecting forwardly from a lower end of the supporting tube 61, the supporting tube 61, the supporting piece 62, the positioning piece 63, and the restricting portion 64 being formed integrally.

A plurality of engaging holes 611 are formed in the supporting tube 61 at intervals in the circumferential direction. Further, a pair of supporting holes 621 are respectively formed in left and right end portions of the supporting piece 62. Furthermore, an engaging piece 631 is projectingly provided on a rear end of the positioning piece 63.

The restricting portion 64 is formed such that a restricting piece 641 projecting forwardly from a lower end of the supporting tube 61 and a pair of restricting arms 642 projecting upwardly from a front end of the restricting piece 641 are integrally formed. The restricting arms 642 have a substantially U-shape as viewed from the front side, and restricting grooves 642a located in such a manner as to oppose each other are respectively formed in their upper end portions (see FIG. 7).

In a standby state in which the piston 3 is retracted in the cylinder 2, the restricting piece 641 is positioned in close proximity to a lower surface of the proximal portion-side connecting portion 412 of the check valve 4, the restricted projections 412c of the connecting portion 412 are set in a state of being located in the respective restricting grooves 642a (see FIG. 7), and the position of the distal end portion of the piston 3 is restricted by the restricting portion 64 of the bracket 6.

Then, the front end portion of the cylinder 2 is fitted in the supporting tube 61 of the bracket 6, and the engaging projections 21a of the cylinder 2 are engaged in the engaging holes 611 of the supporting tube 61, thereby allowing the cylinder 2 to be supported by the bracket 6. The engaging piece 631 of the positioning piece 63 of the bracket 6 is then engaged and positioned by an unillustrated positioning portion formed on the vehicle body. Also, unillustrated bolts inserted in the supporting holes 621 of the supporting piece 62 are fixed by unillustrated nuts to an unillustrated mounting portion formed on the vehicle body, thereby allowing the cylinder 2 to be supported by the vehicle body.

It should be noted that a cover 7 for covering the nozzle 5 with respect to the front side is fixed to the front end of the check valve 4.

Figure 1:
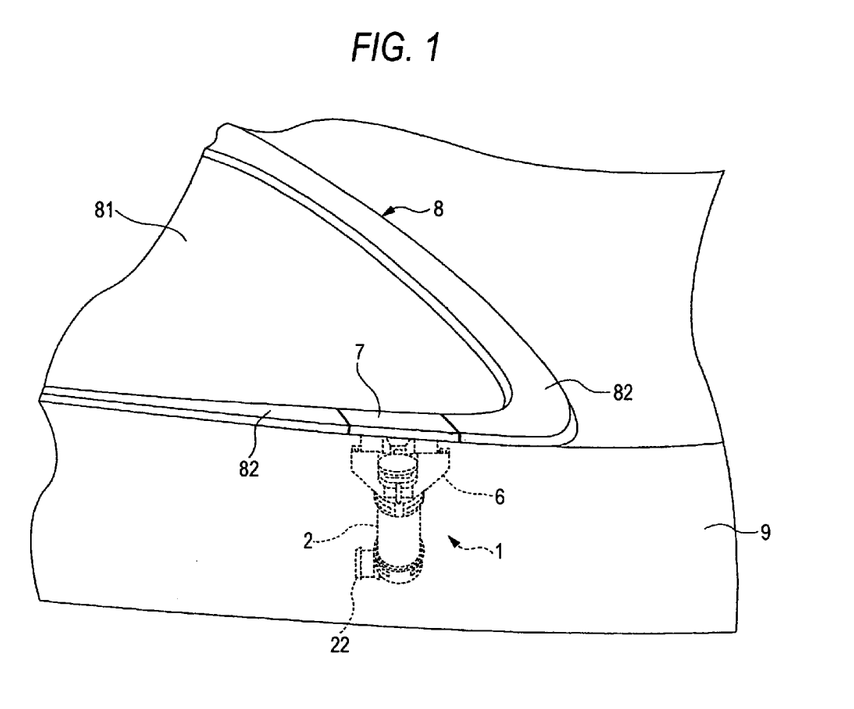
FIG. 1 is a front elevational view of a cleaning device with a headlamp incorporated in a vehicle body, in a standby state.

The above-described cleaning device 1 for a vehicle lamp can be disposed immediately below a vehicle lamp, e.g., a headlamp 8, between the headlamp 8 and a bumper 9. Reference numeral 81 denotes a front lens forming the front surface of the headlamp 8, and a periphery of the front lens 81 is fixed by a rim 82 for decorative use. The cover 7 is constructed so as to form a part of the rim 82. Namely, in the standby position shown in FIGS. 1 to 3, the cover 7 is positioned so as to form a part of the rim 82. As a result, in terms of the appearance, the cleaning device 1 is integrated with the headlamp 8, and the appearance of the vehicle with this cleaning device 1 mounted improves. Only when the cleaning of the front lens 81 is required, the piston 3 projects from the cylinder 2 so that the injection ports 511 of the nozzle bodies 51 are located in front of the front lens 81.

Next, a description will be given of the operation of the above-described cleaning device for a vehicle lamp.

In the standby state in which the piston 3 is retracted in the cylinder 2, i.e., in the state shown in FIGS. 3 to 6, if the cleaning liquid is supplied into the cylinder 2 through an unillustrated cleaning liquid supplying tube connected to the connecting tube 222 of the cylinder 2, since the space between the rear end of the piston 3 and the inner peripheral surface of the cylinder 2 is watertightly held by the seal body 37 fitted over and fixed to the rear end portion of the piston 2, the cleaning liquid passes through an interior 3a of the piston 3, and reaches the pressure forming portion 411c of the check valve 4. Namely, the interior 3a of the piston 3 serves as a cleaning liquid passage.

When the cleaning liquid passage 3a is filled with the cleaning liquid, the pressure of the cleaning liquid within the cleaning liquid passage 3a increases, but since the spring force of the valve spring 44 of the check valve 4 is set to be greater than the spring force of the tensile spring 24 loaded between the cylinder 2 and the piston 3, the tensile spring 24 starts to be extended by the pressure of the cleaning liquid.

Then, as the tensile spring 24 is extended, the piston 3 starts to project from the cylinder 2.

When the flange 32 of the piston 3 abuts against the inner flange 21c of the cylinder 2, the projection of the piston 3 from the cylinder 2 ceases. Then, when the projecting operation of the piston 3 from the cylinder 2 ceases, the pressure of the cleaning liquid within the piston 3 and the cylinder 2 increases further, and the pressure applied to the surfaces of such as the dome-like convex portion 431 of the valve body 43 increases inside the pressure forming portion 411c of the check valve 4. When the pressure applied to the valve body 43 increases, that pressure ultimately overcomes the spring force of the valve spring 44, and the valve spring 44 and the valve body 43 are deflected toward the air holes 421 side, thereby opening the communicating hole 411e and the orifice 411f (see FIG. 13). Accordingly, the flow channel of the cleaning liquid, which consists of the cleaning liquid influx portion 412a, the pressure forming portion 411c, the communicating hole 411e, the valve body accommodating recess 411b (on the side closer to the pressure forming portion 411c side than the valve body 43), the orifice 411f, and the cleaning liquid efflux portion 413a, is opened. The cleaning liquid further passes through the joining portions 413b and reaches the nozzles 5.

It should be noted that since the air holes 421 are formed in the cover body 42 which closes the valve body accommodating recess 411b, the space from the valve body 43 to the cover body 42 is held under normal pressure irrespective of the behavior of the valve body 43. For this reason, the opening and closing operation of the valve body 43 accompanying a change in the cleaning liquid pressure within the pressure forming portion 411c is effected smoothly.

Figure 4:
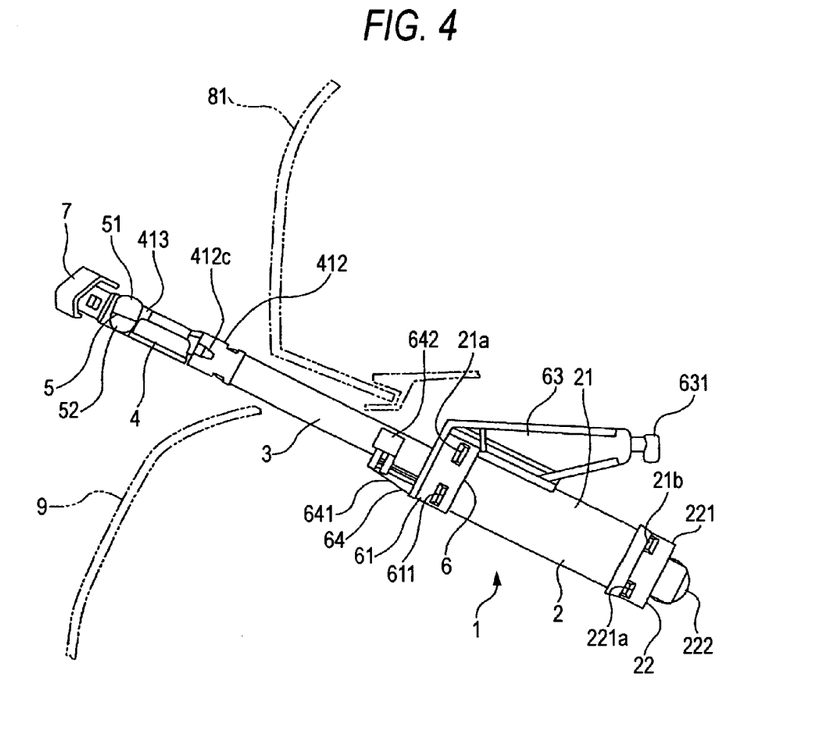
FIG. 4 is a side elevational view of the cleaning device in a state of use.

In addition, in the state of use shown in FIG. 4 and the like, the piston 3 assumes a state in which it projects most from the cylinder 2. However, the supporting state of the piston 3 stabilizes since the piston 3 is supported by the cylinder 2 at two portions including the portion of contact between the outer peripheral surface of the flange 32 and the inner peripheral surface of the cylinder 2 and the position where the outer peripheral surface of the piston 3 contacts the inner peripheral surface of the inner flange 21c of the cylinder 2. Furthermore, even if the piston 3 should sway downwardly by some chance, the restricting piece 641 formed on the bracket 6 is located in close proximity to the proximal portion of the piston 3 from below (see FIG. 7), so that the downward sway of the piston 3 by more than a fixed degree is prevented by the restricting piece 641.

The cleaning liquid which reached the nozzles 5 flows into the nozzle bodies 51 from the nozzle holders 52, and is finally injected from the injection ports 511 toward the front lens 81 of the headlamp 8.

When the supply of the cleaning liquid stops, the cleaning liquid pressure within the pressure forming portion 411c of the check valve 4 drops, so that the spring force of the valve spring 44 overcomes the cleaning liquid pressure within the pressure forming portion 411c. Accordingly, the communicating holes 411e and the orifice 411f are closed by the valve body 43 (see FIG. 12). In consequence, the supply of the cleaning liquid to the nozzles 5 is thereby stopped, and the injection of the cleaning liquid from the injection ports 511 stops. It should be noted that although the cleaning liquid remains between the orifice 411f of the check valve 4 and the injection ports 511, and there is a possibility of the remaining cleaning liquid leaking from the injection ports 511. However, since the distance from the orifice 411f to the injection ports 511 is short, the amount of the cleaning liquid remaining in this portion is very small, so that the leakage of the remaining cleaning liquid presents practically no problem.

Figure 2:
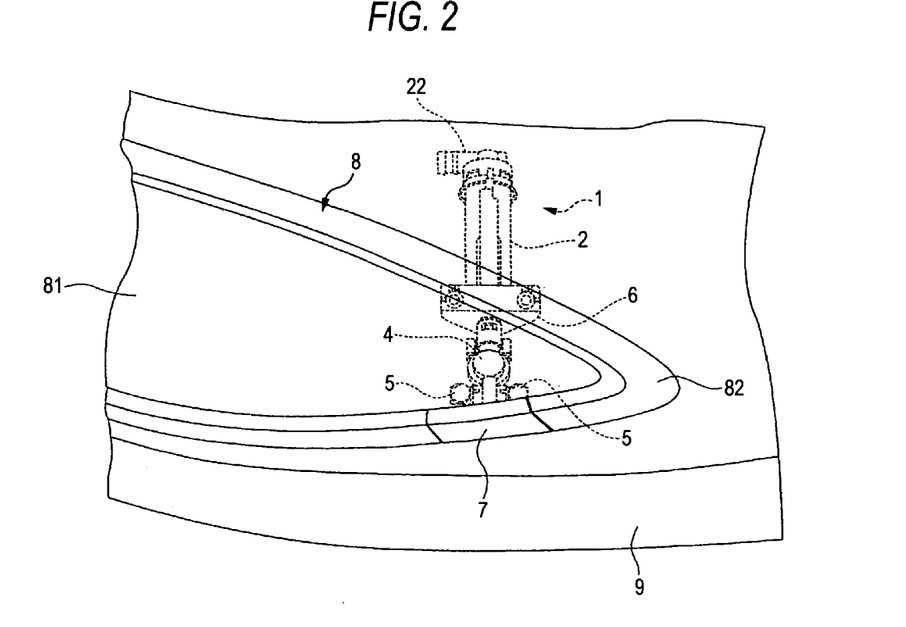
FIG. 2 is a plan view of the cleaning device in the standby state.
Figure 3:
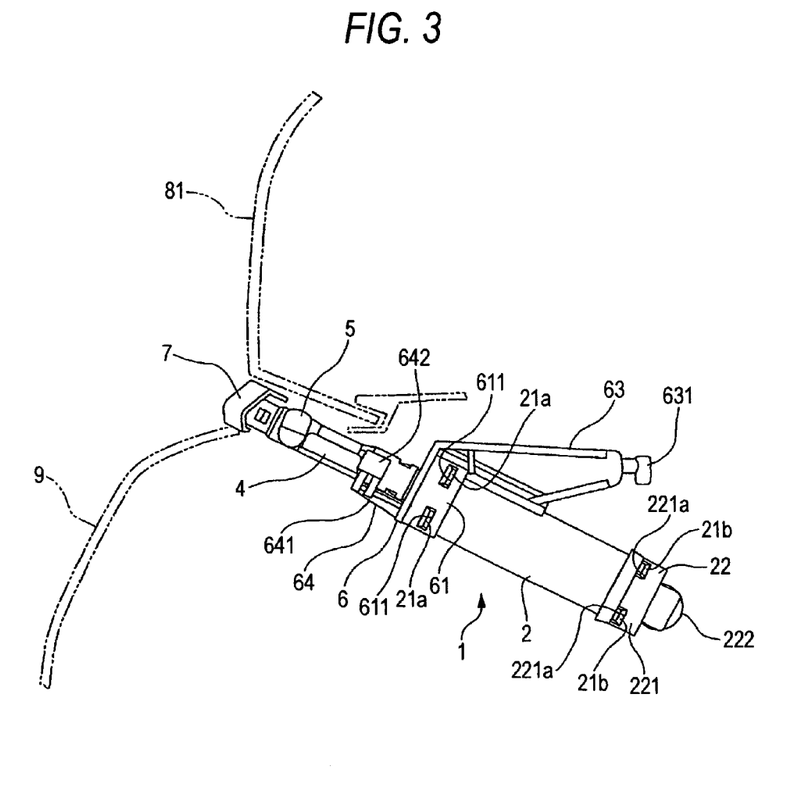
FIG. 3 is a side elevational view of the cleaning device in the standby state.

Then, when the pressure of the cleaning liquid within the piston 3 and the cylinder 2 drops, the spring force of the tensile spring 24 overcomes the pressure of the cleaning liquid, so that the piston 3 is retracted into the cylinder 2 by the tensile spring 24, and ultimately assumes the standby state shown in FIGS. 2 and 3. It should be noted that in any one of this standby state, the state of use, and an intermediate state therebetween, the inner peripheral portion of the dust cover 25 is in a state of close contact with the outer peripheral surface of the piston 3. Accordingly, it is possible to prevent dust and the like from entering the gap between the cylinder 2 and the piston 3 from between the front end portion of the cylinder 2 and the outer peripheral surface of the piston 3. It should be noted that the piston 3 can be easily manufactured if the shape of its outer peripheral surface is a regular polygon, and if it is an ellipse or an elongated circle, since there are no corners (edges), close contact with the inner peripheral portion of the dust cover 25 becomes excellent.

In accordance with the above described embodiments, it is possible to provide a cleaning device for a vehicle lamp which is compact and has a high freedom of the configuration space. The cleaning device for a vehicle lamp in accordance with the invention can be suitably applied to a vehicle in which a large configuration space cannot be secured in the light of the requirements in design.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A cleaning device for a vehicle lamp comprising:
   a cylinder to which a cleaning liquid is supplied;
   a piston slidably coupled to the cylinder and including a cleaning liquid passage;
   a nozzle including a injection port for injecting the cleaning liquid;
   a retracting spring interposed between the piston and the cylinder so as to urge the piston in a direction of retracting the piston into the cylinder;
   a check valve interposed between the nozzle and the piston, wherein the check valve includes a cleaning liquid influx portion, a valve disposing portion, and a cleaning liquid efflux portion; and
   a valve body disposed in the valve disposing portion, wherein at least a portion of the valve body moves in a direction substantially perpendicular to the sliding direction of the piston, so as to open and close a space between the cleaning liquid influx portion and the cleaning liquid efflux portion.

2. The cleaning device according to claim 1, wherein the cleaning liquid influx portion, the valve disposing portion, and the cleaning liquid efflux portion are arranged in series in a sliding direction of the piston.

3. The cleaning device according to claim 1, wherein the valve disposing portion includes:
   a valve body accommodating recess communicating with the cleaning liquid efflux portion and having an air hole communicating with an outside, wherein the valve body accommodating recess is arranged in the direction substantially perpendicular to the sliding direction of the piston;
   a pressure forming portion communicating with the cleaning liquid influx portion, wherein the pressure forming portion is arranged in the direction substantially perpendicular to the sliding direction of the piston; and
   a communicating hole for communicating the valve body accommodating recess and the pressure forming portion,
   wherein the valve body is accommodated in the valve body accommodating recess so as to divide the communicating hole and the cleaning liquid efflux portion and the air hole, and
   when the pressure of the cleaning liquid is increased in the pressure forming portion, the valve body moves toward the air hole, so that the pressure forming portion and the cleaning liquid efflux portion are communicated with each other.

4. The cleaning device according to claim 3, further comprising:
   a convex portion formed on a central portion of the valve body and projecting from the communicating hole to a side of the pressure forming portion during the closing of the communicating hole.

5. The cleaning device according to claim 3, further comprising:
   a valve spring disposed in the valve body accommodating recess and urging the valve body in a direction of closing the communicating hole disposed in the valve body accommodating recess; and
   a plate having high rigidity and interposed between the valve body and the valve spring.

6. The cleaning device according to claim 5, wherein a force with which the retracting spring urges the piston in the direction of retracting the piston into the cylinder is weaker than a force with which the valve spring urges the valve body in the direction of closing the communicating hole.

7. The cleaning device according to claim 5, wherein the valve spring comprises a leaf spring.

* * * * *